United States Patent
Mihailescu et al.

(10) Patent No.: US 12,116,060 B2
(45) Date of Patent: Oct. 15, 2024

(54) METHOD AND CONTROL CIRCUIT FOR CONTROLLING AN ACTIVE REAR AXLE STEERING OF A MOTOR VEHICLE WHEN STEERING OUT FROM STRAIGHT TRAVEL, AND A MOTOR VEHICLE HAVING THE CONTROL CIRCUIT

(71) Applicants: CARIAD SE, Wolfsburg (DE); AUDI AG, Ingolstadt (DE)

(72) Inventors: Adrian Mihailescu, Ingolstadt (DE); Benjamin Schwarz, Ingolstadt (DE); Christian Wiedenmann, Ingolstadt (DE)

(73) Assignees: Cariad SE, Wolfsburg (DE); Audi AG, Ingolstadt (DE)

( * ) Notice: Subject to any disclaimer, the term of this patent is extended or adjusted under 35 U.S.C. 154(b) by 207 days.

(21) Appl. No.: 18/055,353

(22) Filed: Nov. 14, 2022

(65) Prior Publication Data

US 2023/0174147 A1 Jun. 8, 2023

(30) Foreign Application Priority Data

Dec. 2, 2021 (DE) .......................... 10 2021 131 739

(51) Int. Cl.
  *B62D 6/00* (2006.01)
  *B62D 15/02* (2006.01)
(52) U.S. Cl.
  CPC ............. *B62D 6/002* (2013.01); *B62D 6/001* (2013.01); *B62D 6/005* (2013.01); *B62D 15/0215* (2013.01)
(58) Field of Classification Search
  CPC ........ B62D 6/001; B62D 6/002; B62D 6/003; B62D 6/005; B62D 15/021–0245

USPC ........... 701/41; 180/409, 410, 411, 445, 446
See application file for complete search history.

(56) References Cited

U.S. PATENT DOCUMENTS

| | | | |
|---|---|---|---|
| 2015/0127221 A1* | 5/2015 | Pugsley ................. | B62D 6/003 701/41 |
| 2018/0304922 A1* | 10/2018 | Hirate .................... | B62D 5/008 |
| 2019/0002020 A1* | 1/2019 | Yoo ......................... | G01L 5/221 |
| 2020/0130735 A1* | 4/2020 | Chung ................... | B62D 7/159 |
| 2020/0207411 A1* | 7/2020 | Obermüller ............ | B62D 7/159 |
| 2021/0403081 A1* | 12/2021 | Funke .................... | B62D 6/001 |

FOREIGN PATENT DOCUMENTS

| | | |
|---|---|---|
| DE | 102015005023 A1 | 10/2016 |
| DE | 102016210256 A1 | 12/2016 |
| DE | 102018007860 A1 | 4/2019 |
| DE | 102019213969 A1 | 3/2021 |

* cited by examiner

*Primary Examiner* — Erick R Solis
(74) *Attorney, Agent, or Firm* — Seed IP Law Group LLP

(57) ABSTRACT

A method for controlling an active rear axle steering of a motor vehicle when steering out from straight travel with given actual dynamics of the wheel guidance of the motor vehicle, wherein an actual steering signal of the motor vehicle is received by a control circuit from at least one sensor, then from the actual steering signal a dynamic model of the wheel guidance calculates a time variation of a differential signal describing a deviation of the actual steering signal from an imaginary nominal steering signal which would be needed in order to perform the steering with a given nominal dynamics, and from the differential signal a predetermined conversion rule is used to generate a nominal steering signal for the rear axle steering and the rear axle steering is actuated with this.

10 Claims, 3 Drawing Sheets

METHOD AND CONTROL CIRCUIT FOR CONTROLLING AN ACTIVE REAR AXLE STEERING OF A MOTOR VEHICLE WHEN STEERING OUT FROM STRAIGHT TRAVEL, AND A MOTOR VEHICLE HAVING THE CONTROL CIRCUIT

BACKGROUND

Technical Field

Embodiments of the invention relate to a method and a control circuit for controlling the rear axle steering in a motor vehicle when steering out from a straight travel. The rear axle steering is actively designed for this, that is, it comprises at least one actuator in order to set a rear wheel steering angle in dependence on a control signal. Embodiments of the invention also relate to a motor vehicle having such an active rear axle steering and having an embodiment of said control circuit.

Description of the Related Art

The "steering" described here is the period of time within which the wheels on a front axle of the motor vehicle respond or are turned or follow along with the newly established steering wheel angle after the steering wheel angle has been changed. Namely, the wheels do not respond instantaneously to a changing of the steering wheel angle, but rather the undercarriage has a kinematics and/or an elastokinematics which results in a dynamic process upon changing of the steering wheel angle on the steering wheel or upon setting a new angle of rotation of the steering wheel at a new steering position, whereby the wheels adapt their wheel deflection in a dynamic process according to the newly established steering wheel angle in a dynamic process in a new steering position. In other words, the cornering force required by the new steering wheel angle must be built up only gradually. Thus, this steering ends at the moment when the wheel deflection attains the angle value dictated by the newly established steering wheel angle, i.e., until the final value of the cornering force is permanently achieved. The time delay causing the actuation or the offset in time between the changing of the steering wheel angle on the one hand and the achieving of a stationary wheel deflection or the final cornering force according to the steering wheel angle on the other hand is due to elasticity and inertia in the undercarriage, as is known.

An active rear axle steering is known for example from DE 10 2018 007 860 A1. It is described there that an active rear axle steering can be used to stabilize the driving dynamics of a motor vehicle by reducing the necessary steering deflection at the front axle steering, which is compensated by the rear axle steering.

Improving the steering behavior in a motor vehicle is known from DE 10 2015 005 023 A1. According to this, a superimposed steering is required at the front axle, by means of which an additional superimposed angle is created to establish an additional steering deflection. In addition, a rear wheel steering angle can also be established for a rear axle steering. However, this only involves a proportional conversion, that is, for a given current steering wheel angle the rear wheel steering angle is set to a predetermined value according to a characteristic curve. But this cannot compensate for the dynamics of a wheel guidance, such as is dictated by an elasticity or limited stiffness eigenvalue and/or by an eigenfrequency of the undercarriage. Instead, it may result in a swinging motion if intensified too much.

It is known from DE 10 2016 210 256 A1 that the driving dynamics of the motor vehicle can be stabilized by means of a rear axle steering in the case of vigorous steering movements on a steering wheel. For this, however, vigorous steering deflections on the steering wheel must be identified.

It is known from DE 10 2019 213 969 A1 that a displacement of the rear wheels relative to the front wheels by means of an active rear axle steering can apply tension to the undercarriage of the motor vehicle in order to reduce its tendency to shaking.

BRIEF SUMMARY

There is no solution found in the prior art to compensate for the kinematics and the elastokinematics in the wheel guidance of the front wheels such that the steering deflection of the front wheels or the cornering force is only delayed during the steering of a motor vehicle and adapted with an undercarriage-dependent dynamics to the new angle value dictated by the newly established steering wheel angle.

Some embodiments adapt the steering behavior of a motor vehicle, starting from a straight ahead travel, at least under small changes in the steering wheel angle, such that a buildup in time of the lateral force to the new stationary value results, such as would occur with a larger stiffness eigenvalue of the wheel guidance than the one which is available.

Some embodiments encompass a method for controlling an active rear axle steering of a motor vehicle during a steering out from a straight travel. Thus, the rear axle steering comprises an actuator for the motorized and/or hydraulic deflection of the rear wheels, in order to establish a rear wheel steering angle at the rear axles. The "steering" mentioned here is the already described dynamic process of changing the steering wheel angle on the steering wheel until achieving the corresponding stationary wheel deflection and/or cornering force at the front wheels. An alternative definition of the steering is the dynamic process of changing the steering wheel angle from an original value to a new value until achieving the cornering force on the roadway corresponding to this new steering wheel angle. The method starts from the case when a straight travel obtains at the beginning. Thus, it is assumed that the motor vehicle at first was moving straight ahead and then the driver moved the steering wheel angle on the steering wheel, for example in order to continue moving forward with a slanting to the right or left. The actual dynamics of the wheel guidance describes how quickly and/or with what time variation (i.e., with what impulse response or step response) the steering deflection or the cornering force of the wheel follows the steering wheel position. This is no ideal step response (a Dirac impulse), but rather the actual dynamics of the wheel guidance is dependent on an elasticity of the components of the undercarriage, such as the elasticity of the steering rod and/or the mass inertia of the components. An eigenfrequency, i.e., an eigenvibration behavior in the undercarriage, may also play a role. On the whole, it can be assumed that a mass/spring system results between the steering wheel on the one hand and the front wheels at the front axle on the other hand, thereby resulting in the actual dynamics of the wheel guidance.

The method is based on the assumption that this actual dynamics of the wheel guidance of the motor vehicle is known. It can be measured on a prototype of the motor vehicle, for example, and/or be calculated numerically by a simulation and/or by a vehicle model.

In the method, a control circuit is used to receive an actual steering signal (such as that of a front axle steering of the motor vehicle) from at least one sensor and a time variation is calculated by means of a dynamic model of the wheel guidance for a differential signal which describes a deviation of the actual steering signal relative to an imaginary nominal steering signal such as would be necessary in order to perform the steering with a given nominal dynamics (for the given actual steering signal). Thus, for example, the system monitors the steering wheel angle or the yaw rate or the transverse velocity which is currently present, thereby yielding the actual steering signal as a time signal. The actual steering wheel signal can be converted or interpreted by means of a dynamic model of the wheel guidance to yield the described impulse response or step response of the undercarriage up to the front axle, i.e., it can be determined as a time variation of the described steering. However, the only item of interest here is which differential signal, i.e., which deviation from an ideal or at least a given nominal dynamics will result, such as a nominal dynamics of the buildup of lateral forces or a buildup of the yaw rate (for the intended curve negotiation). The differential signal thus describes the nominal steering signal that would be needed in order to achieve the desired or given nominal dynamics, i.e., a buildup of lateral forces or the steering response behavior or a development over time of the yaw rate (the speed of rotation about the vertical axis of the vehicle), which simulates or replicates for example a stiffly designed front axle. The differential signal for example can be dictated in a very simple implementation as a function of the actual steering signal by a table and/or a characteristic, the differential signal being a dynamic signal in the described manner, i.e., one which specifies a time variation, and not being a simple constant, as is known in the prior art, but describing a change over time (a constantly differentiable time signal, not having any constant variation over time). The actual steering signal here can be a simple step function, describing a step or a change from an original or preceding steering wheel angle to a new (stationary) steering wheel angle. The differential signal for example describes the difference or the steering behavior which the driver or the motor vehicle will need to exhibit if he wishes to achieve the given nominal dynamics for the front wheels or the cornering force (with only the front wheel steering). The differential signal can described the additional value which is lacking for the buildup of the lateral force or the yaw rate in order to achieve the nominal dynamics.

From the differential signal a nominal steering signal is generated for the rear axle steering by means of a predetermined conversion rule and the rear axle steering is actuated with this. The differential signal, i.e., the missing part of the steering behavior at the front axle, is thus achieved not by a superimposed angle for the front wheel steering, but instead a nominal steering signal is dictated at the rear axle steering in order to achieve the nominal dynamics by means of the rear axle steering in the motor vehicle.

Some embodiments provide the benefit that a stiffness eigenvalue and/or an eigenfrequency, i.e., the overall kinematics and elastokinematics at the front axle, does not need to be designed so stiff or hard to achieve a given nominal dynamics during the steering process out from straight travel, which would require a very "stiff" design of the front axle (at the expense of ride comfort). Instead, for example, for the benefit of ride comfort the front axle can be designed more "soft," i.e., with a lesser stiffness eigenvalue, and the desired nominal dynamics for the steering out from straight travel is imposed or replicated by means of the rear axle steering. Hence, the "softer" design of the front axle which may improve ride comfort, i.e., the stiffness eigenvalue which is actually too low for the nominal dynamics, can still be maintained in other driving situations.

Some embodiments also encompass modifications which produce additional benefits.

One modification involves the dynamic model of the wheel guidance taking into account an actual value Dact, ω0act and a nominal value Dnom and ω0nom each time for a stiffness eigenvalue D and for an eigenfrequency ω0 of the front axle steering. This provides the benefit that both the stiffness and the spring behavior of the front axle steering is taken into account, so that a rocking motion of the motor vehicle can be avoided. The respective actual value can be determined for example by means of a measurement on a prototype of the motor vehicle and/or by means of simulation and/or the vehicle model and these actual values can be saved as parameters in the control circuit. The respective nominal value can be dictated according to the desired nominal dynamics.

One modification involves the actual steering signal being a time signal with a continuous or sample variation, and the model comprising a transfer function, describing a ratio V of the actual dynamics to the nominal dynamics, wherein the nominal dynamics specifies in particular a greater axle slip stiffness as compared to the actual dynamics, and the transfer function is used to compute the nominal steering signal or the differential signal. The actual steering signal can thus be processed continuously or stepwise by means of the transfer function as a continuous time signal or as a sampled time signal, in order to obtain a current value for the nominal steering signal in continuous or stepwise manner. For this, a mathematical convolution can be used, for example. Hence, given a continuous changing of the actual steering signal, the nominal steering signal can follow along with it. For example, the actual dynamics can describe the transfer of the actual steering signal into the time variation of the actual steering deflection or the actual cornering force. Accordingly, the nominal dynamics can describe the time variation of the nominal steering deflection or the nominal cornering force as a function of the time signal of the actual steering deflection. The mentioned convolution can be used in order to calculate the time signal of the actual steering signal with the transfer function in the so-called time domain. In some embodiments, however, or with less computing expense, the convolution can be replaced by a multiplication in the frequency domain, for example on the basis of the Laplace transform, as is known in the prior art.

In the following, a ratio V is indicated for a description of the actual dynamics and the nominal dynamics, comprising both the stiffness eigenvalue D and the eigenfrequency (DO. This modification involves the transfer function being configured as a PD2T2 element and the ratio V being indicated as $$V = \frac{1 + s \cdot \frac{2 \cdot D_{act}}{\omega_{0act}} + s^2 \cdot \frac{1}{\omega_{0act}^2}}{1 + s \cdot \frac{2 \cdot D_{nom}}{\omega_{0nom}} + s^2 \cdot \frac{1}{\omega_{0nom}^2}}$$

and the nominal steering signal Ldyn(s) being calculated from the actual steering signal L(s) as $$L_{dyn}(s) = L(s) \cdot V$$

and the differential signal being calculated as $D(s)=L_{dyn}(s)-L(s)$. The transfer function as a PD2T2 element makes it possible to take into account both the first time derivative and the second time derivative and thus also to take into account the vibration behavior of the front axle steering. The differential signal is specified here in the Laplace domain $D(s)$ and can be converted in known manner by means of the inverse Laplace transform into a time signal. The differential signal then indicates the contribution required from the rear axle steering to achieve the nominal dynamics for the given actual steering signal of the front axle steering. The nominal dynamics in particular describes the time behavior of the motor vehicle when establishing or "building up" the cornering force as a response to the changing of the actual steering signal and it "mimics" or replicates the given nominal stiffness eigenvalue and nominal eigenfrequency.

One modification involves calculating the nominal steering signal for the control of the rear axle steering by means of a proportionality factor or by means of a dynamic model of the motor vehicle from the differential signal. Thus, from the time signal, which can be computed from the differential signal $D(s)$, it is possible to calculate the nominal steering signal for the rear axle steering by means of a proportionality factor, which is especially easy to implement by computer technology, since only a multiplication is needed. But it is also possible to use a dynamic model of the motor vehicle in order to establish the rear wheel steering angle for the rear axle steering. One example of such a dynamic model is the so-called single-lane model and the model for tire forces. The steering angle signal for the control of the rear axle steering is called here the "nominal signal," in order to point out that the rear axle steering can also have a feedback control, which can dictate the nominal steering signal as a nominal value signal.

One modification involves a parametrization of the dynamic model of the wheel guidance to be established as a function of a current driving speed of the motor vehicle. In other words, it can be provided, for different speed values of the driving speed v, that corresponding different or adapted values are also specified for the stiffness eigenvalue and/or eigenfrequency. These can be dictated by means of a table and/or a computational function. In other words, therefore, the stiffness eigenvalue D and/or the eigenfrequency (DO are also given as a function of the driving speed v of the motor vehicle. The driving speed v can be detected in known manner. For example, the driving speed v can a signal picked off from a data BUS of the motor vehicle, for example one available in a CAN BUS (CAN—Controller Area Network).

One modification involves the generating of the nominal steering signal to be activated only upon recognition of a preceding straight travel, and at least one of the following signals is monitored for such a recognition:
  a steering wheel angle (13),
  a front axle steering angle,
  a lateral acceleration,
  a yaw rate,
and the straight travel is recognized if at least one or all of the monitored signals are in a respectively predetermined value range for a predetermined minimum duration. In other words, the rear axle steering will only be actuated when a straight ahead travel is in fact present at the beginning as the starting situation. This can be recognized from at least one of the described quantities. Several of these signals can also be combined and monitored. By dictating a minimum duration, such as at least one second or at least five seconds or at least 30 seconds, the rear axle steering will not be activated as well during an S-curve, for example. The minimum duration may lie in a range of one second to one minute. The described signals are available in a motor vehicle, and can be read out for example in the described manner from the aforesaid data BUS.

One modification involves the generating of the nominal steering signal to be confined to predetermined driving situations encompassing at least one of the following:
  steering rate less than a predetermined maximum value,
  highway driving, country road driving,
  driving in a building construction zone,
  the actual steering signal (25) indicates a stationary steering angle smaller than a predetermined highest value.

A steering rate is the speed of turning the steering wheel. If the system only responds to a small steering rate, one can avoid an oversteering in event of a strong or vigorous steering on account of actuating the rear wheel steering. Driving on a highway and driving on a country road can be detected for example with the aid of map data, in that a current geoposition of the motor vehicle is recognized (such as can be determined by a receiver of a position signal of a GNSS—Global Navigation Satellite System, for example the GPS—Global Positioning System). A building construction zone can be detected in known manner by surveillance of the surroundings, for example, by analyzing camera images of an environment camera for certain image patterns, such as signal colors or signal patterns of a construction site (red and white stripes). The method can also be confined to those driving situations in which the actual steering signal indicates only a small stationary final steering angle, i.e., the actual steering signal is smaller in amplitude than a highest value in a range of 5 degrees to 20 degrees, for example, especially 5 degrees to 15 degrees. Thus, starting from a straight ahead travel, if the steering wheel angle changes by more than the highest value, the nominal steering signal for the rear axle steering can likewise be suppressed or avoided.

Some embodiments encompass a control circuit for a motor vehicle, wherein the control circuit is adapted to receive an actual steering signal of a front axle steering of the motor vehicle and to generate by means of an embodiment of the described method a nominal steering signal for an active rear axle steering and to actuate the rear axle steering with this. The control circuit for example can be based on a controller or a group of several controllers of the motor vehicle. The control circuit can comprise at least one microprocessor to carry out the method. The control circuit can contain a program code, which is designed to be executed by the control circuit and to cause it to carry out the method. The program code can be stored in a data storage of the control circuit, to which the at least one microprocessor can be connected. In addition or alternatively to the at least one microprocessor, at least one microcontroller and/or at least one FPGA (Field Programmable Gate Array) and/or at least one DSP (Digital Signal Processor) can be provided as the processor circuit.

Some embodiments encompass a motor vehicle having an active rear axle steering and having at least one sensor for detecting an actual steering signal of a front axle steering of the motor vehicle, wherein the at least one sensor and the rear axle steering are coupled via an embodiment of the described control circuit. The at least one sensor may comprise, for example, a steering wheel angle sensor. Some embodiments are configured as a motor vehicle, such as a passenger car or truck, or as a passenger bus or motorcycle.

Some embodiments encompass combinations of the features of the described embodiments. Some embodiments encompass a combination of the features of several of the described embodiments, so long as the embodiments are not described as being mutually exclusive.

DETAILED DESCRIPTION

The described components of the embodiments each time represent individual features, to be viewed independently of each other, and which can also modify the embodiments independently of each other. Therefore, the disclosure should also encompass other than the represented combinations of features of the embodiments. Furthermore, the described embodiments can also be amplified with other of the already described features.

In the figures, the same reference numbers designate functionally identical elements each time.

Figure 1:
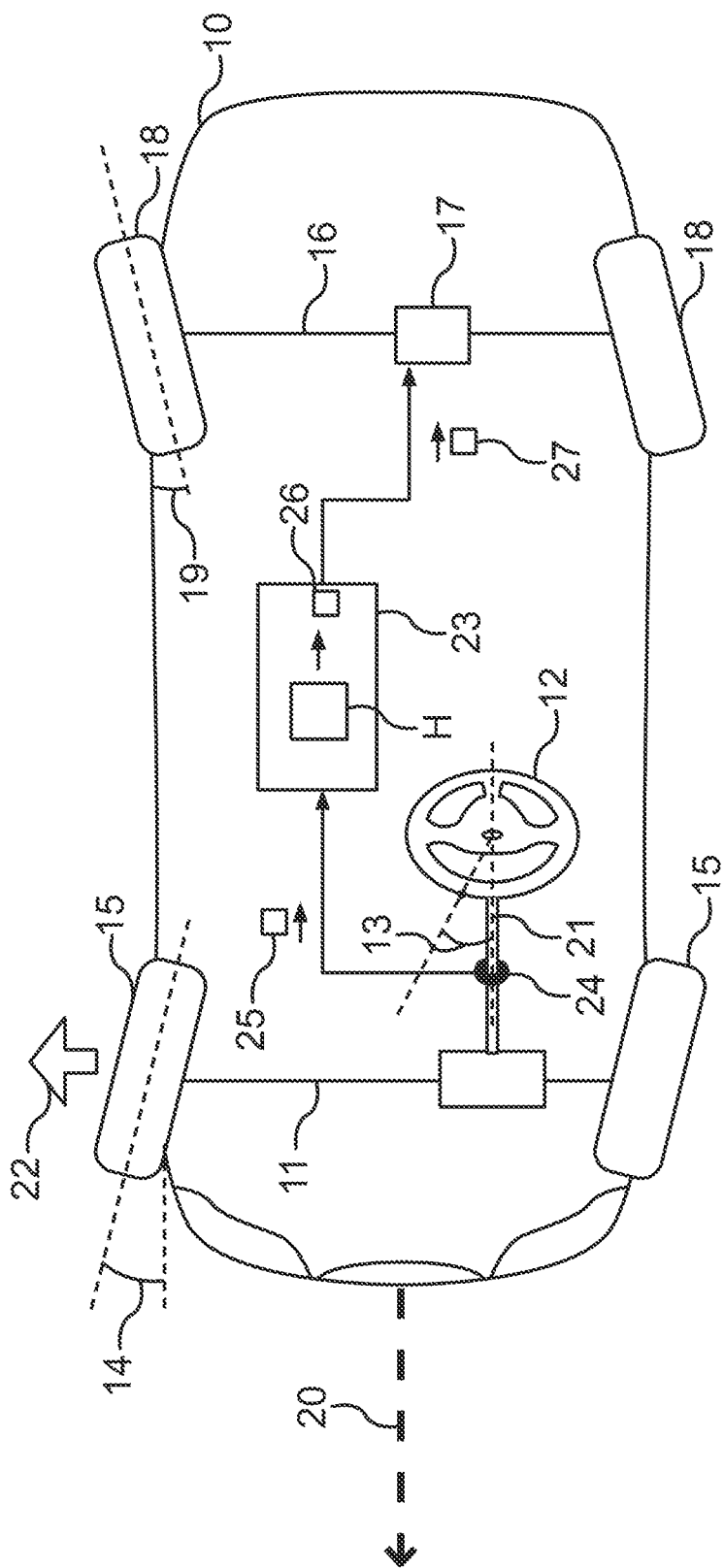
FIG. 1 is a schematic representation of one embodiment of a motor vehicle.

FIG. 1 shows a motor vehicle 10, which can be an automobile, especially a passenger car or a truck. It shows how a steering deflection 14 of the front wheels can be established or dictated by establishing a steering wheel angle 13 at a front axle steering 11 by means of a steering wheel 12, resulting in a cornering force 22 for negotiating a curve when the steering deflection 14 is different from 0 degrees.

Furthermore, a rear axle steering 16 can be provided in the motor vehicle 10, which as an active rear axle steering can establish a rear wheel steering deflection or rear axle steering angle 19 by means of at least one actuator 17 at the rear wheels 18.

For a driving situation in the motor vehicle 10 in which a driver (not shown) changes the steering wheel angle 13 on the steering wheel 12, starting from a neutral position 21 for the straight travel 20, the resulting change in the steering deflection 14 and/or a resulting change or a buildup of the cornering force 22 to a stationary value corresponding to the newly established steering wheel angle 13 is supported or dictated by actuating the rear axle steering 16 by means of a control circuit 23 so that a nominal dynamics results for the wheel guidance or when building up the cornering force 22.

For this, by means of at least one sensor 24 it is possible to measure or detect or indicate the steering wheel angle 13 as the actual steering signal 25, for example. The control circuit 23 can receive the actual steering signal 25 and use a transfer function H to convert or map the actual steering signal 25 into a differential signal 26 which indicates how many degrees or which value of the steering wheel angle 13 needs to be changed in order to obtain the given nominal dynamics. From this differential value 26 it is possible to determine a nominal steering signal 27, for example by multiplying the differential signal 26 with a predetermined proportionality factor. The nominal steering signal 27 can be provided to the rear axle steering 16 as a default or nominal value for regulating the rear axle steering deflection or rear axle steering angle 19, that is, the rear axle steering 16 can be actuated by the control circuit 23 with the nominal steering signal 27.

Thus, when adjusting the steering wheel angle 13 the driver will have a nominal dynamics when changing or leveling out or building up the steering deflection 14 and/or the cornering force 22, even though the front axle steering 11 is not designed for this nominal dynamics, for example, but instead may have a smaller stiffness eigenvalue and/or a different eigenfrequency, corresponding to the actual dynamics.

Figure 2:
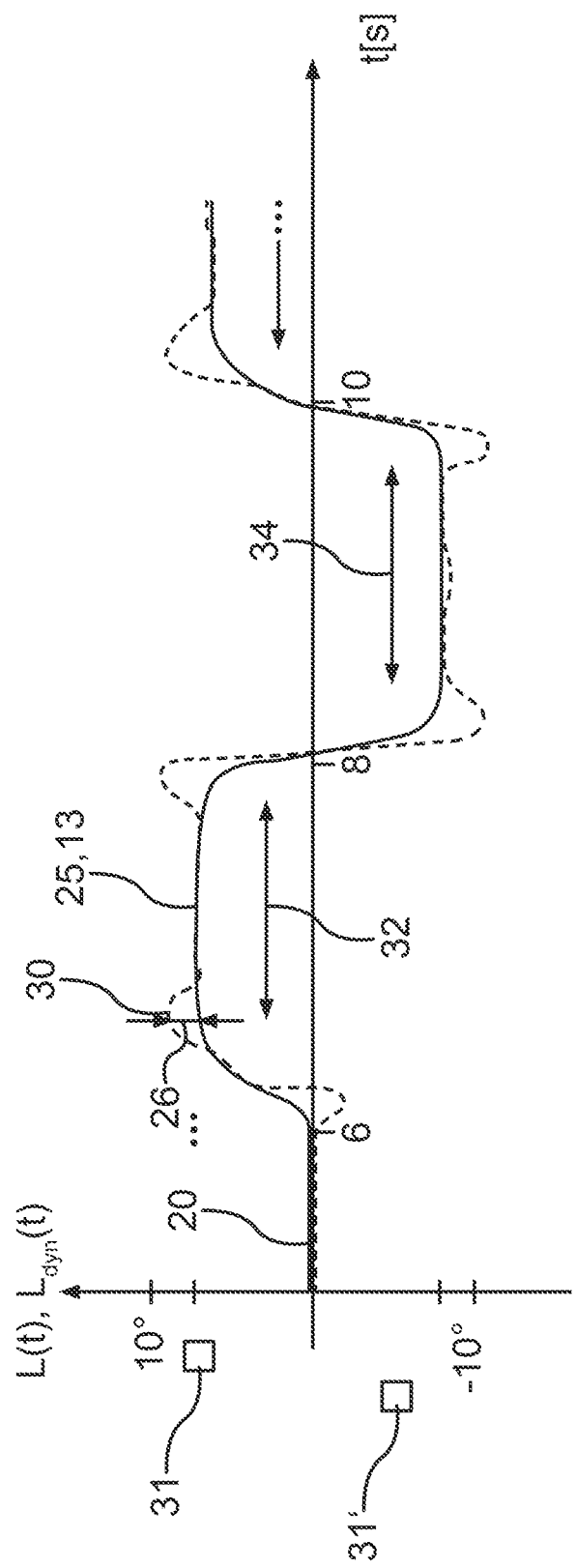
FIG. 2 is a diagram to illustrate the time variation of an actual steering signal and the time variation of a differential signal resulting from the actual steering signal with the aid of a transfer function.

FIG. 2 illustrates how, over the course of time t, a dynamic or corrected steering angle signal 30, also noted here as L (t), results in accordance with the transfer function H from a dynamic model of the wheel guidance in dependence on the actual steering signal 25, which may correspond here to the steering wheel angle 13 or the yaw rate, and which describes a steering angle signal that would be necessary in order to achieve the nominal dynamics during the buildup or the time variation of the cornering force 22 or the yaw rate. The diagram shows how, starting from the straight travel 20 (actual steering signal at 0 degrees) a new stationary angle value 31 can result from turning the steering wheel 12, which can be around 8 degrees here, for example. Accordingly, a curve 32 is being negotiated. For this, the front axle steering produces the cornering force 22, but this cannot be provided at once when beginning the steering maneuver. In order to hasten or achieve by the nominal dynamics the buildup or the adjustment of the cornering force 22 in order to trach the newly established actual steering signal 25 (with the new angle value 31), the imaginary steering angle signal Ldyn (t) is needed, i.e., the steering angle signal 30, which can be calculated by means of a dynamic model, for which a larger stiffness eigenvalue and/or a different eigenfrequency is assumed, as compared to the given actual dynamics. The differential signal 26 can be calculated from the steering signals 25, 30, from the difference between the imaginary steering angle signal 30 Ldyn (t) and the actual steering signal 25.

At the end of the steering maneuver to negotiate the curve 32, the driver can turn the steering wheel 12 back in the opposite direction and a further steering maneuver 34 will occur for a new steering wheel angle 31'. Thus, as shown, the driver can also carry out the straight ahead travel 20 by alternate performance of the steering maneuver for negotiating curves 32, 34.

Figure 3:
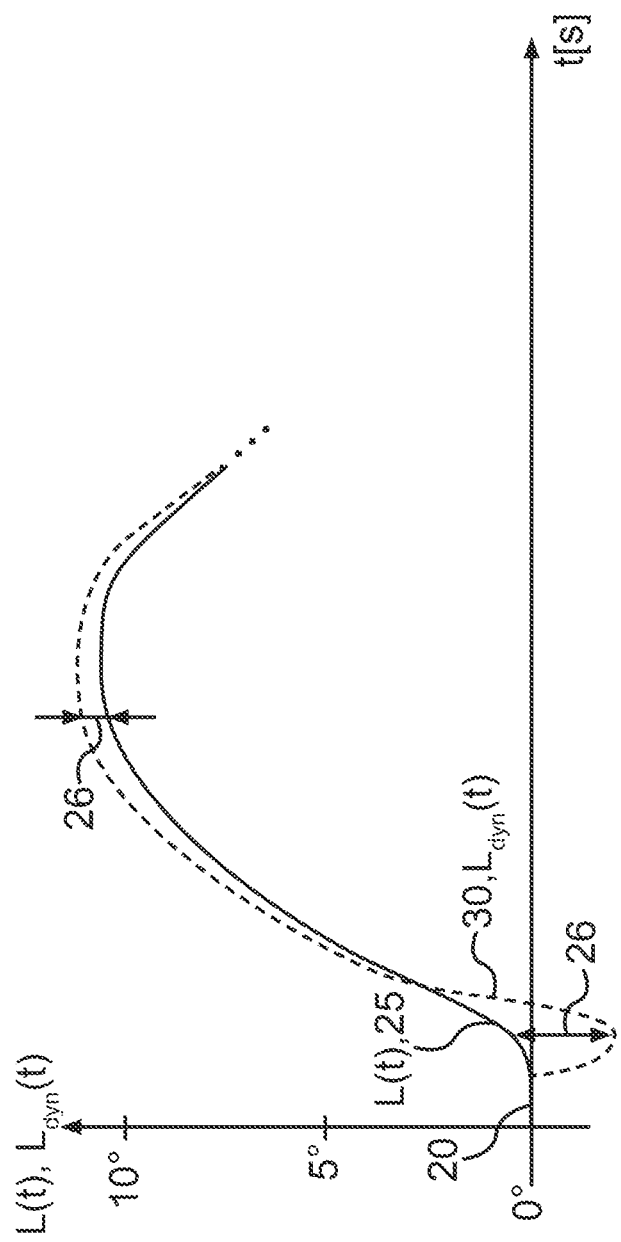
FIG. 3 is a diagram with time curves of the actual steering signal and the differential signal.

FIG. 3 shows that the rear axle steering during the steering maneuver is steered opposite to the front axle (opposite deflection). Accordingly, no noteworthy difference is recognized for the two steering angles shown, so that no further nominal value results for the rear axles from the on-center dynamic adjustment after achieving the given cornering force.

The rear axle steering system can thus be used for an optimal design of the steering response of a vehicle out from straight travel (on-center) despite soft and comfortable elastokinematic properties of the front axle. Since the rear axles of a vehicle generally have a greater axle slip stiffness than the front axle, small slip angles result in already significant lateral forces.

The optimization of the steering response of a vehicle from out of straight travel (on-center) and the ride comfort are no longer contrary target attributes, but instead they can be achieved at the same time.

The steering wheel angle of the driver is measured in particular by means of a steering wheel angle sensor (alternatively also the steering angle of the front wheels). Based on this signal, an oppositely directed steering motion of the rear wheels is calculated for small steering wheel angle (straight travel). The additional computed angle of the rear wheels may only be active for a very short time after the initial steering wheel movement, so as not to adversely affect the further course of the steering movement and the negotiation of the curve.

One possible mathematical computation can be realized for example by means of the described PD2T2 transfer function H. The parametrization of the PD2T2 transfer function may be dependent on the driving speed.

The straight travel can be defined with the aid of the following signals:
steering wheel angle or front axle steering angle,
lateral acceleration,
yaw rate.

Thus, in order to design the steering response of a vehicle from out of straight travel (on-center) with a nominal dynamics, despite soft and comfortable elastokinematic properties of the front axle, the rear axle steering system can be used. Since the rear axles of a vehicle generally have a higher axle slip stiffness than the front axle, small slip angles at the rear axles already result in significant lateral forces.

On the whole, the examples show how an optimization of the on-center (straight ahead travel) steering response can be achieved by means of the rear axle steering system.

German patent application no. 10 2021 131739.8, filed Dec. 2, 2021, to which this application claims priority, is hereby incorporated herein by reference, in its entirety. Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for controlling an active rear axle steering of a motor vehicle when steering out from straight travel with given actual dynamics of a wheel guidance of the motor vehicle, comprising:
receiving an actual steering signal of the motor vehicle, by a control circuit, from at least one sensor,
calculating, from the actual steering signal, by a dynamic model of the wheel guidance, a time variation of a differential signal describing a deviation of the actual steering signal from an imaginary nominal steering signal which would be needed to perform the steering with a given nominal dynamics,
using a predetermined conversion rule to generate, from the differential signal, a nominal steering signal for the rear axle steering, and
actuating the rear axle steering based on the nominal steering signal.

2. The method according to claim 1, wherein the dynamic model of the wheel guidance takes into account an actual value $D_{act}$, $\omega_{0act}$ and a nominal value $D_{nom}$ and $\omega_{0nom}$ each time for an stiffness eigenvalue D and for an eigenfrequency $\omega_0$ of the front axle steering.

3. The method according to claim 1, wherein the actual steering signal is a time signal and the model includes a transfer function, describing a ratio V of the actual dynamics to the nominal dynamics, wherein the nominal dynamics indicates in particular a greater axle slip stiffness as compared to the actual dynamics, and the nominal steering signal or the differential signal is calculated by means of the transfer function.

4. The method according to claim 3, wherein the transfer function is configured as a PD2T2 element and the ratio V is indicated as $$V = \frac{1 + s \cdot \frac{2 D_{act}}{\omega_{0act}} + s^2 \cdot \frac{1}{\omega_{0act}^2}}{1 + s \cdot \frac{2 D_{nom}}{\omega_{0nom}} + s^2 \cdot \frac{1}{\omega_{0nom}^2}}$$

and the nominal steering signal Ldyn(s) is calculated from the actual steering signal L(s) as $$L_{dyn}(S) = L(s) \cdot V$$

and the differential signal is calculated as D(s)=Ldyn(s)−L(s).

5. The method according to claim 1, wherein the nominal steering signal for the rear axle steering is calculated:
using a proportionality factor; or
using a dynamic models of the motor vehicle from the differential signal.

6. The method according to claim 1, wherein a parametrization of the dynamic model of the wheel guidance is established as a function of a current driving speed of the motor vehicle.

7. The method according to claim 1, wherein the generating of the nominal steering signal is activated only upon recognition of a preceding straight travel, and at least one of the following signals is monitored for such a recognition:
a steering wheel angle,
a front axle steering angle,
a lateral acceleration,
a yaw rate, and
the straight travel is recognized if at least one or all of the monitored signals are in a respectively predetermined value range for a predetermined Minimum duration.

8. The method according to claim 1, wherein the generating of the nominal steering signal is confined to predetermined driving situations encompassing at least one of the following:
steering rate less than a predetermined maximum value,
highway driving, country road driving,
driving in a building construction zone, and
the actual steering signal indicates a stationary steering angle smaller than a predetermined highest value.

9. A control circuit for a motor vehicle, wherein the control circuit is adapted to receive an actual steering signal of a front axle steering of the motor vehicle and to perform a method comprising:
receiving the actual steering signal,
calculating, from the actual steering signal, by a dynamic model of a wheel guidance, a time variation of a differential signal describing a deviation of the actual steering signal from an imaginary nominal steering signal which would be needed to perform the steering with a given nominal dynamics,
using a predetermined conversion rule to generate, from the differential signal, a nominal steering signal for the rear axle steering, and
actuating the rear axle steering based on the nominal steering signal.

10. A motor vehicle having an active rear axle steering and having at least one sensor for detecting an actual steering signal of a front axle steering of the motor vehicle, wherein the at least one sensor and the rear axle steering are coupled via a control circuit according to claim 9.

* * * * *